United States Patent
Park

(10) Patent No.: US 7,207,346 B2
(45) Date of Patent: Apr. 24, 2007

(54) HYDROSTAT FOR PORTABLE GAS RANGE

(76) Inventor: Jin-Ha Park, 101-104 Kangbyun Apartment, 1-2 Mannyun-dong, Seo-ku, Taejon 302-150 (JP)

( * ) Notice: Subject to any disclaimer, the term of this patent is extended or adjusted under 35 U.S.C. 154(b) by 475 days.

(21) Appl. No.: 10/471,173

(22) PCT Filed: Apr. 17, 2002

(86) PCT No.: PCT/KR02/00698

§ 371 (c)(1),
(2), (4) Date: Sep. 9, 2003

(87) PCT Pub. No.: WO02/084179

PCT Pub. Date: Oct. 24, 2002

(65) Prior Publication Data

US 2004/0079410 A1    Apr. 29, 2004

(30) Foreign Application Priority Data

Apr. 18, 2001  (KR) ............... 2001-0020940
Nov. 24, 2001  (KR) ............... 2001-0073649

(51) Int. Cl.
*F16K 17/36* (2006.01)
*F23N 5/10* (2006.01)

(52) U.S. Cl. ............... 137/79; 137/543; 251/86; 431/80

(58) Field of Classification Search ............... 137/79, 137/542, 543; 251/86; 431/78, 80
See application file for complete search history.

(56) References Cited

U.S. PATENT DOCUMENTS

| | | | | |
|---|---|---|---|---|
| 1,020,981 A | * | 3/1912 | Miller | 209/646 |
| 1,377,199 A | * | 5/1921 | Granby | 137/542 |
| 2,264,656 A | * | 12/1941 | Briscoe et al. | 137/536 |
| 2,530,091 A | * | 11/1950 | Smith | 137/538 |
| 5,094,259 A | | 3/1992 | Hsu | |
| 5,181,846 A | | 1/1993 | Chang | |

FOREIGN PATENT DOCUMENTS

JP          05227626 A    3/1995

* cited by examiner

*Primary Examiner*—A. Michael Chambers
(74) *Attorney, Agent, or Firm*—Harness, Dickey & Pierce P.L.C.

(57) ABSTRACT

Provided is a hydrostat for a portable gas range, which prevents the explosion of a gas container by automatically discharging overcompressed gas from the gas container when the inner pressure of the gas container increases to an explosion pressure. The hydrostat includes a body including a gas outlet, which communicates with a gas inlet of the governor valve, and a sealed room, which communicate with the gas outlet. An opening/closing unit is installed within the sealed room of the body such that it can elastically move up and down in order to discharge overcompressed gas by opening the gas outlet when the inner pressure of the gas container reaches or exceeds a threshold value of deformation. A cap is fixed at the bottom of the body so as to support the opening/closing unit and has a discharge hole for discharging overcompressed gas, which escapes the gas container through the gas outlet.

5 Claims, 12 Drawing Sheets

HYDROSTAT FOR PORTABLE GAS RANGE

This application is the national phase under 35 U.S.C. § 371 of PCT International Application No. PCT/KR02/00698 which has an International Filing Date of Apr. 17, 2002, which designated the United States of America.

BACKGROUND OF THE INVENTION

The present invention relates to a hydrostat for a portable gas range, and more particularly, to a hydrostat for automatically discharging gas, which is overcompressed into a gas container installed in a portable gas range when the inner pressure of the gas container continuously increases due to a radiant heat even after gas flow is usually blocked by a container-detaching safety device extinguishing a fire when an abnormal pressure occurs within the gas container, thereby preventing the gas container from exploding.

Generally, gas ranges are widely used when preparing a light meal or dish outdoors or indoors. Due to portability and convenience, the number of gas range users and the possible uses of gas ranges have increased. Accordingly, various safety devices have been developed to reduce accidents associated with gas ranges.

As shown in FIGS. 1 through 3, a general portable gas range 1 includes a container guide 5 which guides a gas container 3 in association with the down motion of an installing/detaching lever 2 so that the gas container 3 is installed to a governor valve 4 in a horizontal direction. The portable gas range 1 also includes a spark plug 6, a control lever 7 for controlling the strength of spark and combustion, a burner 8 for providing flames, and a cover 9 for covering the gas container 3. As shown in FIG. 2, when the installing/detaching lever 2 is pulled down, the container guide 5 moves forward so that the gas container 3 is installed to the governor valve 4. When the installing/detaching lever 2 is pushed up, the container guide 5 moves backward so that the gas container 3 is detached from the governor valve 4.

When the inner pressure of the gas container 3 reaches a dangerous level, the installing/detaching lever 2 moves up due to the operation of a container-detaching safety device, so the container guide 5 moves backward detaching the gas container 3 from the governor valve 4, thereby preventing the overpressure of the gas container 3. As shown in FIG. 3, in a state in which the gas container 3 is detached from the governor valve 4, when the inner pressure of the gas container 3 reaches a deforming pressure due to a radiant heat, a deformable portion 3a, which is provided at the top of the gas container 3, swells so that the outlet of the gas container 3 closely contacts the governor valve 4. In the case of a flow-blocking type portable gas range, when the inner pressure of a gas container reaches a dangerous level, the flow path of a governor valve is blocked by the operation of a flow-blocking safety device to prevent overpressurization of the gas container.

However, the present invention provides a hydrostat for the portable gas range 1 to prevent the gas container 3 from exploding by automatically discharging overcompressed gas from the gas container 3, when the inner pressure of the gas container 3 continuously increases to a threshold value of deformation, even after gas flow is primarily blocked by an existing safety device and a fire may have been extinguished.

Generally, when gas is supplied from a gas container to a portable gas range, the temperature of the gas container decreases due to the latent heat of vaporization, which is generated by gas absorbing surrounding heat while vaporizing, such that the probability of a gas explosion due to an increase in temperature is low.

However, since a cooker mounted on a portable gas range is heated, a radiant heat from the bottom of the cooker may be transmitted to a gas container. Here, when the radiant heat is more than the latent heat of vaporization, which is taken away from the gas container while the gas of the gas container vaporizes, heat corresponding to a difference between the radiant heat and the latent heat of vaporization is accumulated at the gas container, thus increasing the temperature of the gas container. Expansion of gas due to the increase of the temperature results in an increase in the inner pressure of the gas container.

In the Republic of Korea, only portable gas ranges, in which gas flow is automatically blocked for extinguishing a fire when the inner pressure of a gas container is in a range of 5–7 $kg/cm^2$, are permitted to be manufactured and sold. In Japan, only portable gas ranges, in which gas flow is automatically blocked for extinuishing a fire when the inner pressure of a gas container is in a range of 4–6 $kg/cm^2$, are permitted to be manufactured and sold.

To block the gas flow, there is provided a safety device. In the Republic of Korea, a container-detaching safety device blocks the gas flow by detaching a gas container from the inlet of a governor of a portable gas range when the inner pressure of the gas container is in a range of 5–7 $kg/cm^2$. In Japan, a flow-blocking safety device blocks the gas flow by blocking a flow path within a governor of a portable gas range when the inner pressure of a gas container is in a range of 4–6 $kg/cm^2$. The container-detaching type is mainly used in the Republic of Korea, and the flow-blocking type is mainly used in Japan.

These safety devices are provided for preventing the explosion of a gas container due to an increase in the inner pressure of the gas container, which results from the expansion of gas that occurs when the temperature of the gas container is increased by accumulation of heat corresponding to the difference between a radiant heat and the latent heat of vaporization where the radiant heat is more than the latent heat of vaporization.

For example, it is defined that the normal pressure of a butane gas container used in a portable gas range is in a range of 2–3 $kg/cm^2$, the primary deforming pressure of the gas container is 13 $kg/cm^2$, and the secondary deforming pressure of the gas container is 15 $kg/cm^2$. In other words, it is regulated that the gas container be manufactured to not explode until the inner pressure of the gas container reaches 15 $kg/cm^2$. Accordingly, an explosion of the gas container can be prevented by blocking the flow of gas at the inner pressure of 5–7 $kg/cm^2$ and extinguishing a fire when the inner pressure of the gas container increases due to a radiant heat in order to prohibit the inner pressure of the gas container from increasing to the threshold value of explosion.

As shown in FIGS. 4 and 5, a body 11 of a flow-blocking safety device includes an inlet 11a which a gas container 3 is installed to or detached from; a chamber 12 for maintaining the gas pressure, which is supplied to a burner, constant; a control lever 14 for controlling the volume of gas supplied to the burner; and a flow path for connecting the inlet 11a, the chamber 12, and the control lever 14.

A gas blocking unit 50 for blocking the flow path when a gas pressure exceeds a reference value is provided in the flow path between the inlet 11a and the chamber 12. A pressure control unit 30 for maintaining the pressure of gas, which is supplied to a burner, constant is installed within the chamber 12. The gas blocking unit 50 is composed of a taper hole 51 whose diameter decreases toward the back of the flow path, a cylinder hole 52 which straightly communicates with the taper hole 51, a blocking valve 53 which is installed within the taper hole 51 and the cylinder hole 52 and is moved backward by the pressure of gas, and a plate spring 54 which elastically supports the back of the blocking valve 53. The plate spring 54 contacts a return valve 55 whose one end is exposed to the outside. A return lever 56, which slides up and down and pushes forward the return valve 55, is installed outside above the return valve 55.

The blocking valve 53 is composed of a blocking portion 57, which is located in front of the taper hole 51, and an operating portion 58, which is located within the cylinder hole 52. An O-ring is installed around the outer circumference of the blocking portion 57 in order to hermetically seal the taper hole 51 when the blocking valve 53 moves backward, and an O-ring is installed around the outer circumference of the operating portion 58 in order to prevent the leakage of gas.

In addition, a nozzle 59 communicating with the chamber 12 is provided at one side of the cylinder hole 52 in front of the operating portion 58.

The pressure control unit 30 includes a rubber plate 31 which is hermetically sealed in an upper portion of the chamber 12; a spring 32 which presses down the rubber plate 31; a needle holder 33 which is connected to the rubber plate 31; and a needle valve 35, which is connected to the body 11 via a hinge at the center, is connected to the needle holder 33 at one end, and has a stopper 34 for closing and opening the nozzle 59 at the other end.

Accordingly, when a user turns on the gas range, gas within the chamber 12 is supplied to the burner, decreasing the gas pressure within the chamber 12, so the rubber plate 31 is pressed by the spring 32 separating the needle valve 35, which is hinge-connected to the body 11, from the nozzle 59 so that gas in a gas container flows into the chamber 12.

When the pressure of gas flowing into the chamber 12 exceeds a predetermined value, the rubber plate 31 overcomes the elasticity of the spring 32 and is lifted up so that the needle valve 35 blocks the nozzle 59.

In addition, when the gas pressure exceeds a reference value due to the overheating of the gas container, the blocking valve 53 overcomes the elasticity of the plate spring 54 and moves backward blocking the taper hole 51 so that gas supply is interrupted and the fire of the burner is extinguished.

The above-described flow-blocking safety device cannot cope with a rapid increase of pressure within the gas container, which still remains within the gas range after the gas supply is interrupted primarily, due to a radiant heat occurring after the heat of vaporization, which is generated when liquefied gas within the gas container vaporizes.

In many cases, the explosion of a gas container has been prevented by interrupting the gas supply at a dangerous pressure level. However, there have been constant accidents where a gas container explodes even after a safety device operates.

Recently, an approach for preventing the explosion of a gas container was disclosed in Korean Patent Application No. 2000-0065187.

FIG. 6 is a side-sectional view of a safety device for a portable gas range, as disclosed in Korean Patent Application No. 2000-0065187. The safety device further includes a gas discharge unit 60 in addition to a flow-blocking safety device for a portable gas range. The gas discharge unit 60 is composed of a housing 61 which includes a through-hole 61a communicating with a flow path and a discharge hole 61b for discharging gas outside; and a safety bar 63 which is elastically supported by a spring 62 so that it closely contacts the through-hole 61a.

A cylinder hole 64 is provided within the housing 61. The through-hole 61a is provided at one end of the cylinder hole 64, and a circular cap 65 is screw-connected to the other end of the cylinder hole 64. The discharge hole 61b is provided at the circumferential wall of the cylinder hole 64 near the through-hole 61a, and a nozzle 66 extending outside is connected to the discharge hole 61b.

The safety bar 63 is composed of a piston portion 63a, which is inserted into the cylinder hole 64 within the housing 61 so that it is moved by a gas pressure; and a sealing portion 63b, which closely contacts the through-hole 61a. The spring 62 supported by the inner wall of the cap 65 is provided at the back of the safety bar 63.

Accordingly, as described above, when the pressure of gas within the chamber 12 exceeds a predetermined value, the needle valve 35 of the pressure control unit 30 blocks the nozzle 59, primarily interrupting the gas supplied to the chamber 12. Continuously, the gas container is overheated increasing the pressure of supplied gas over the reference value. Then, the plate spring 54 operates to secondarily interrupt the gas supply so that the fire of the burner is extinguished.

In this state, when the gas pressure of the gas container exceeds a predetermined value, for example, 13–15 kg/cm$^2$, due to a fire occurring near the gas range or a latent heat which is accumulated in the gas range or the gas container, the safety bar 63 of the gas discharge unit 60 overcomes the elasticity of the spring 62 and moves backward opening the through-hole 61a. As a result, gas within the gas container is discharged outside through the nozzle 66, decreasing the inner pressure of the gas container. Accordingly, even if the gas container is continuously overheated, it can be safely used without exploding.

However, in this conventional embodiment, since the housing 61 is formed to have the through-hole 61a extending from the taper hole 51, the structure is complicated. In addition, since the gas discharge unit 60 protrudes from the side of the body 11, the volume of the body 11 increases, which requires a structural change in a usual portable gas range.

Since the through-hole 61a of the housing 61 is not simply a gas passage but is mechanically connected to a primary safety device, which is operated by the plate spring 54, it is necessary to separately manufacture the housing 61 from the body 11 in order to operate the blocking portion 57 using the spring 58a. Accordingly, a process of assembling the body 11 and the housing 61 is additionally needed.

Moreover, the discharge hole 61b needs to be formed within the gas range so that gas is discharged preferably downward or outside using a connection pipe. For this, the extra nozzle 66 must be formed, so the entire structure of the safety device becomes complicated.

In the case of the container-detaching safety device for detaching a gas container from a gas range, since an external mechanical unit needs to be installed, the ratio of defective products to finished products is high. When it is used for a long term, an operating portion easily corrodes or is easily contaminated with foreign substances, so the safety device does may not operate even if the inner pressure of the gas container increases to a dangerous value.

Moreover, the container-detaching safety device, which detaches the gas container using the external unit, requires a great power to forcibly detach the gas container and also increases in size.

Although the latent heat of vaporization disappears shortly after a container-detaching safety device or a flow-blocking safety device blocks the path of gas flow so as to extinguish a fire when the pressure of a gas container increases over a predetermined value, the gas container totally absorbs a radiant heat from a cooker, such as a frying pan, even after the fire is extinguished, so the pressure of the gas container rapidly increases. As a result, the inner pressure of the gas container exceeds a primary container deformation pressure and reaches a secondary container explosion pressure, exploding the gas container.

The use of larger cookers may further increase the chances for container explosion. According to "(5-1) The use of a larger cooker than a tripod" at "Paragraph 5—The Incidents Related to Portable Butane Burners (Portable Gas Ranges) and Combined Containers (Butane Gas Containers)" of the Gas Incident Yearbook (Chapter 4, pp. 185, 2000) published by Korea Gas Safety Corporation, the cause of some incidents occurs since a larger cooker than the tripod of a portable butane burner was used. The combined container installed in the burner was heated by a radiant heat and exploded due to an increase in the inner pressure thereof. For example, while meat was being roasted using a portable butane burner, an overpressure cutoff of the burner operated, and after a short time, a butane can exploded with a bang sound.

This report indicates that a gas container exploded even when an existing safety device operated normally. In other words, the fact that the gas container exploded with a bang sound after the existing safety device operated suggests that while the latent heat of vaporization disappears after gas flow is blocked, a radiant heat is still applied to the gas container rapidly increasing the inner pressure of the gas container over a deforming pressure to an explosion pressure, so the gas container explodes. Consequently, it further suggests that existing safety devices cannot fundamentally prevent explosion of a gas container.

Accordingly, development of a new safety device for fundamentally preventing the explosion of a gas container in a portable gas range is desired.

SUMMARY OF THE INVENTION

To solve the above problems, the present invention provides a hydrostat for preventing the explosion of a gas container in a gas range.

The present invention provides a hydrostat for preventing the explosion of a gas container in a portable gas range even if the inner pressure of the gas container increases due to a radiant heat continuously applied to the gas container after gas flow is blocked by a container-detaching safety device.

The present invention provides a hydrostat for a portable gas range, which has a simple structure, operates simply, and is applied in various ways.

In an exemplary embodiment, there is provided a hydrostat for a portable gas range, which includes a container-detaching safety device for automatically detaching a gas container to interrupt gas flow and extinguish a fire when the inner pressure of the gas container reaches a dangerous value or a flow-blocking safety device for blocking the path of gas flow with the gas container still installed to extinguish a fire when the inner pressure of the gas container reaches a dangerous value. The hydrostat includes a body comprising a gas outlet, which communicates with a gas inlet of the governor valve, and a sealed room, which communicates with the gas outlet; an opening/closing unit which is installed within the sealed room of the body such that it can elastically move up and down in order to discharge over-compressed gas by opening the gas outlet when the inner pressure of the gas container reaches at least a threshold value of deformation or explosion; and a cap which is fixed at the bottom of the body so as to support the opening/closing unit.

DETAILED DESCRIPTION OF THE PREFERRED EMBODIMENTS

Hereinafter, preferred exemplary embodiments of the present invention will be described with reference to the attached drawings.

Figure 1:
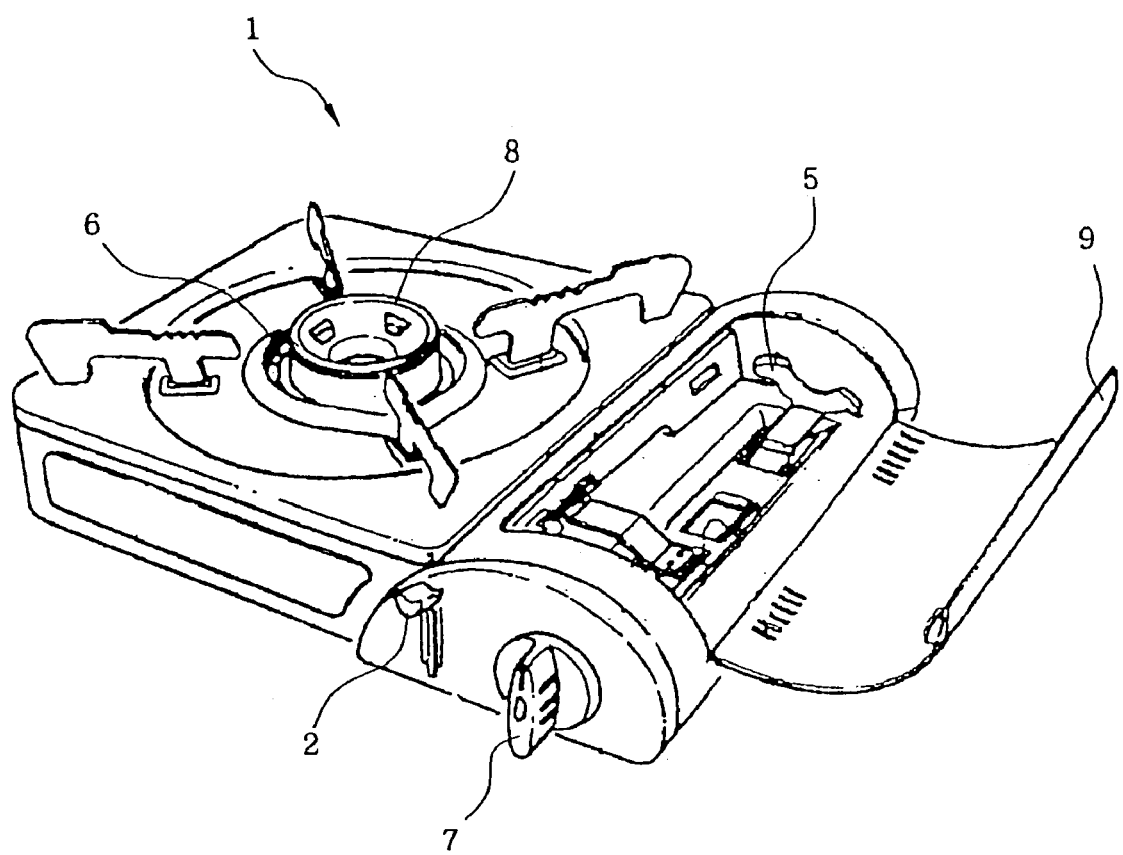
FIG. 1 shows a structure of a conventional portable gas range.
Figure 2:
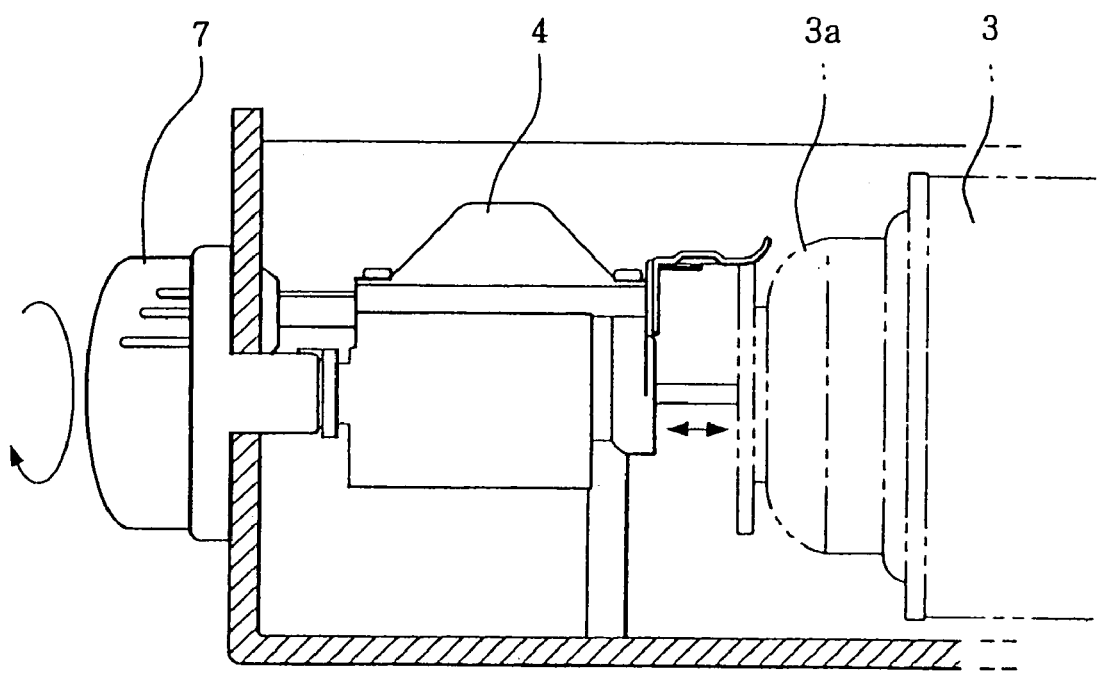
FIG. 2 is a plan view of a state in which a gas container is installed in or detached from the gas range shown in FIG. 1.
Figure 3:
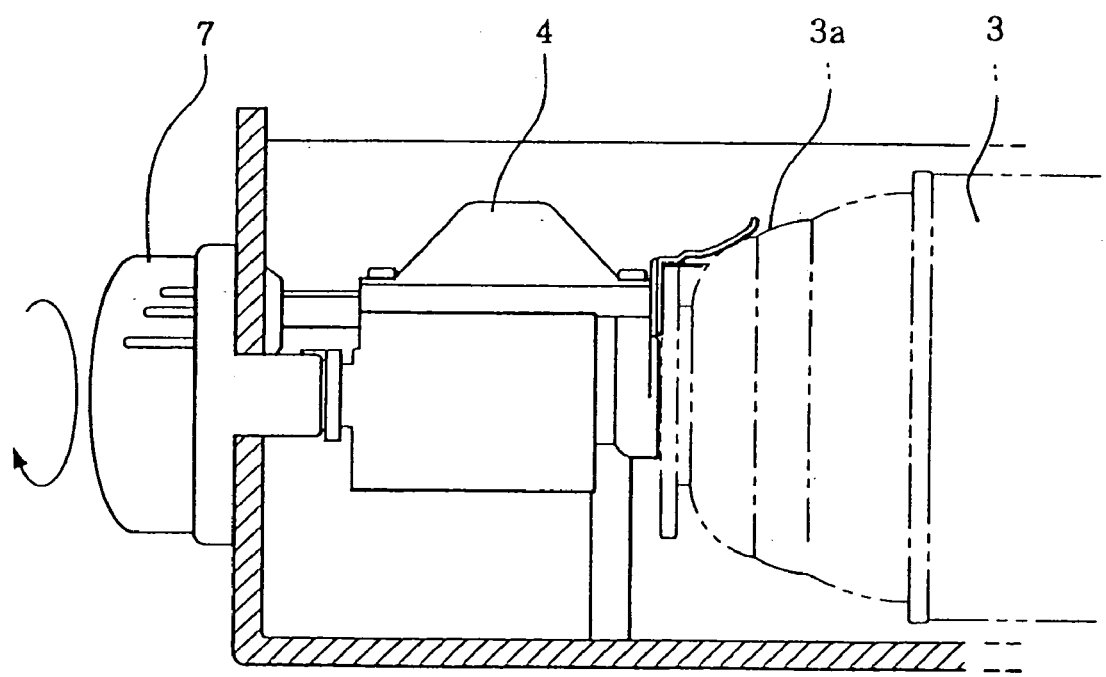
FIG. 3 is a plan view of a state in which a detached gas container is deformed and closely contacts a governor valve.
Figure 4:
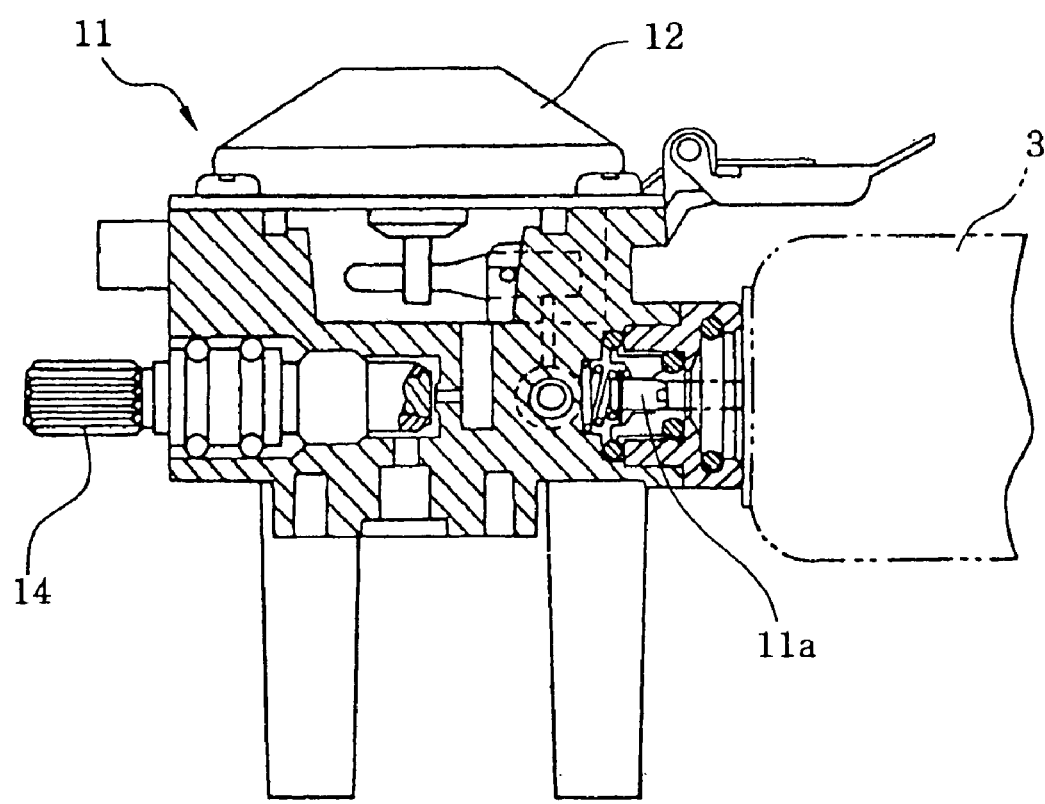
FIG. 4 is a side sectional view of a conventional flow-blocking type portable gas range.
Figure 5:
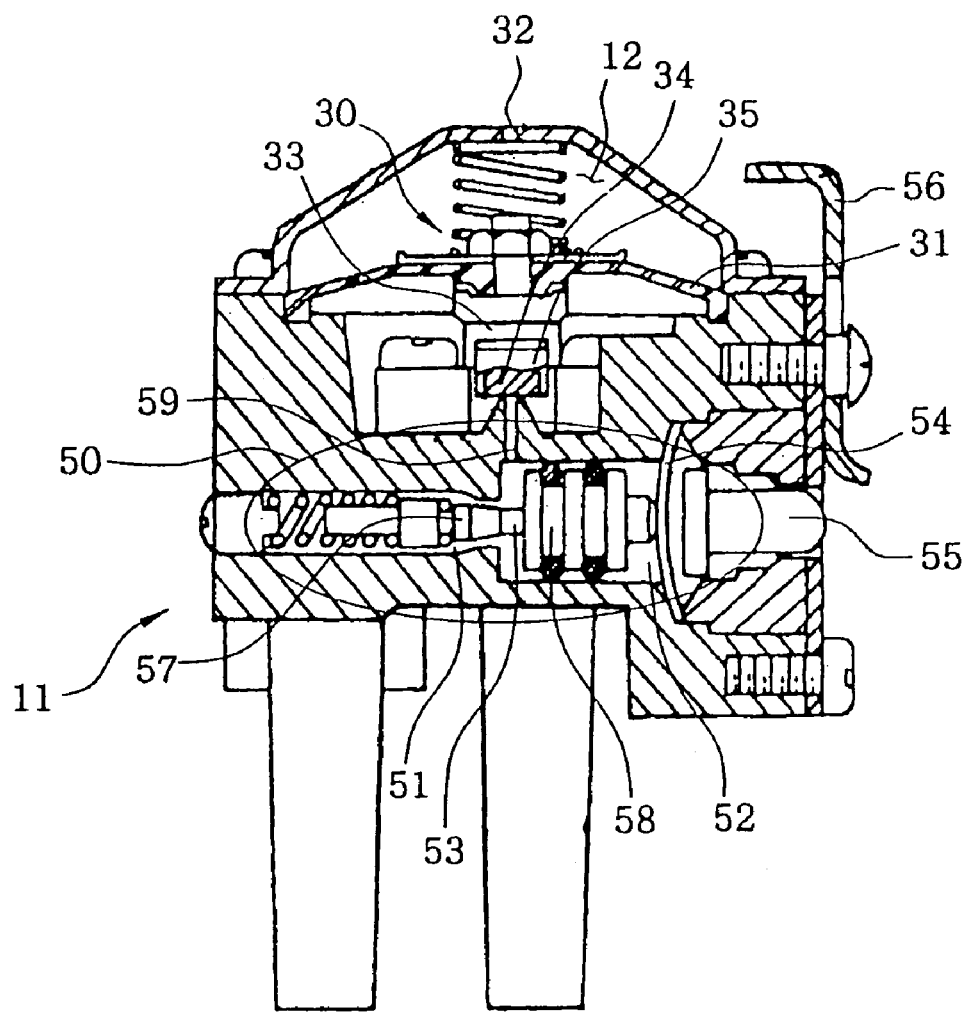
FIG. 5 is a front view of the portable gas range shown in FIG. 4.
Figure 6:
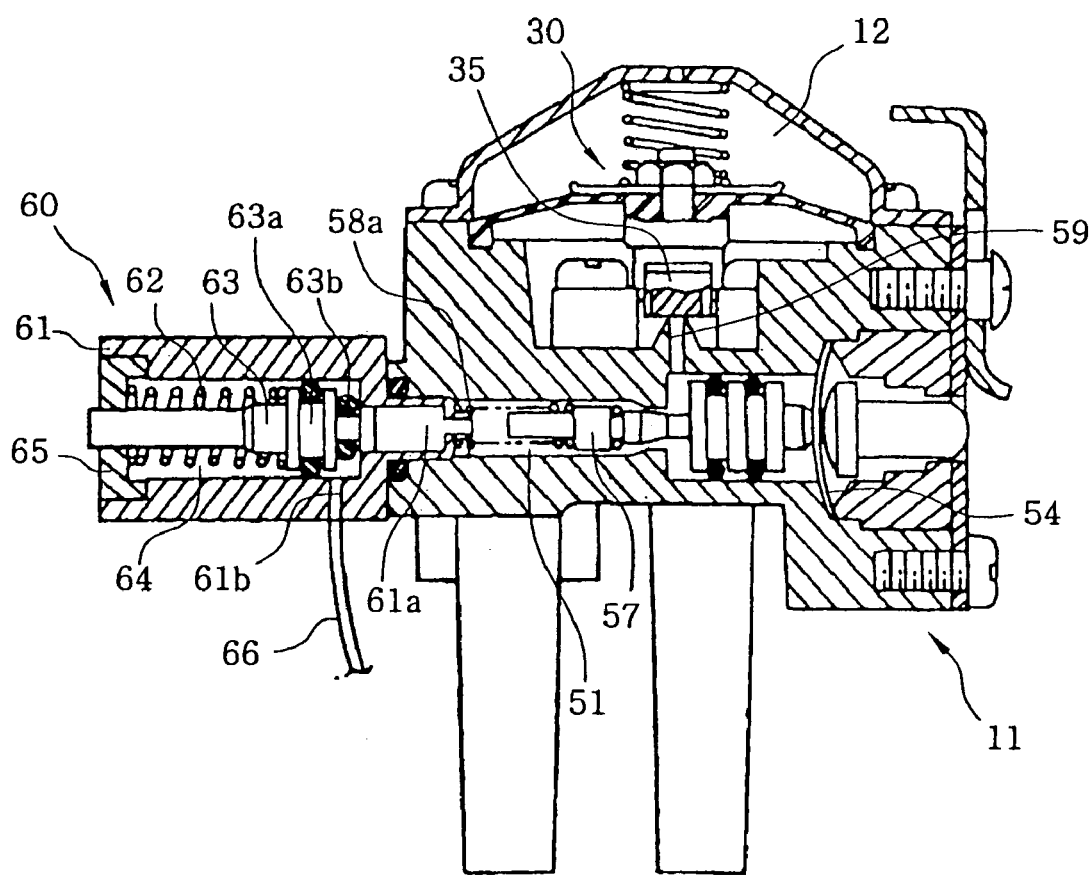
FIG. 6 is a front view of a conventional hydrostat for a portable gas range.
Figure 7:
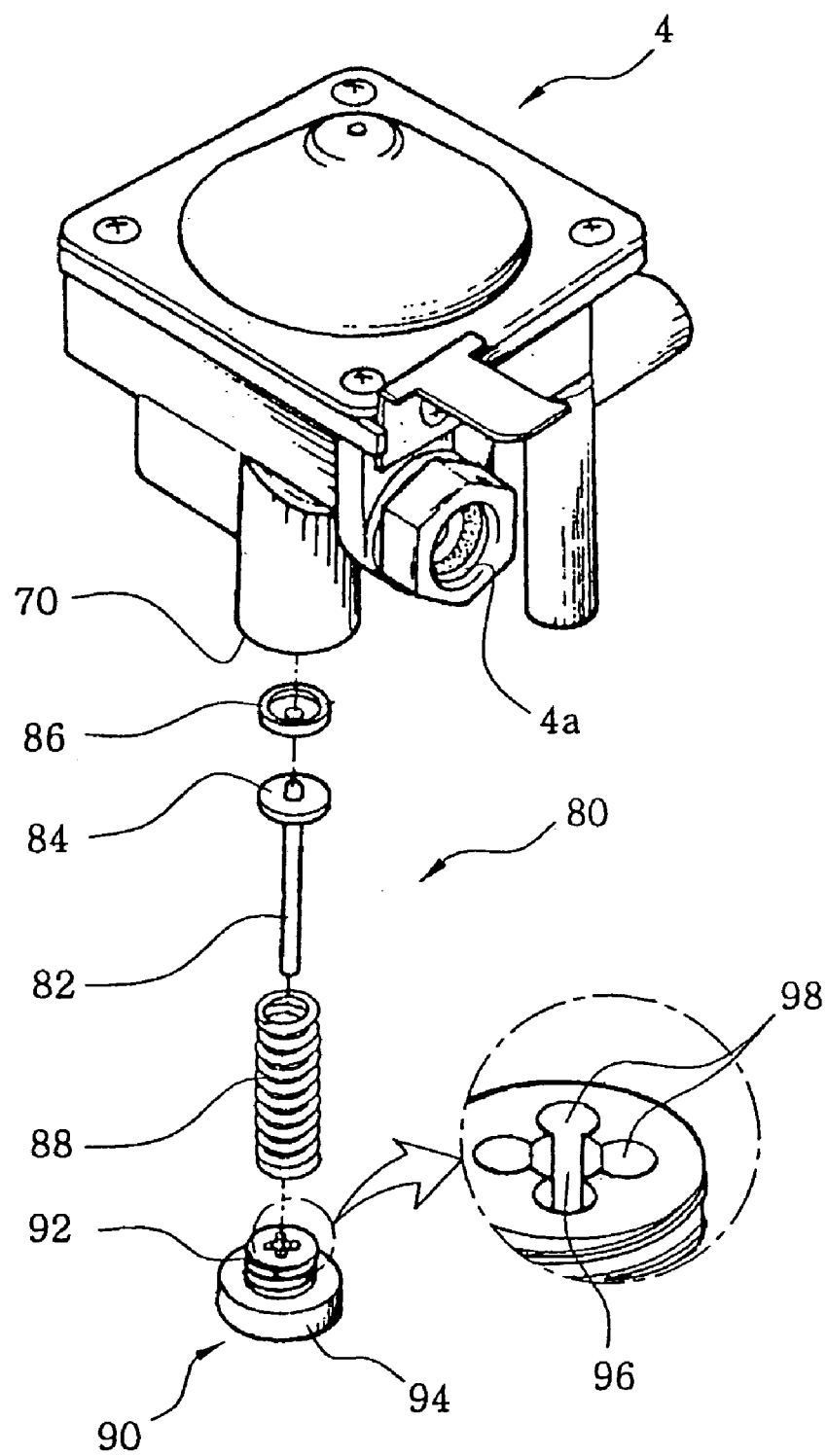
FIG. 7 is an exploded perspective view of a hydrostat for a portable gas range according to a first embodiment of the present invention.
Figure 8:
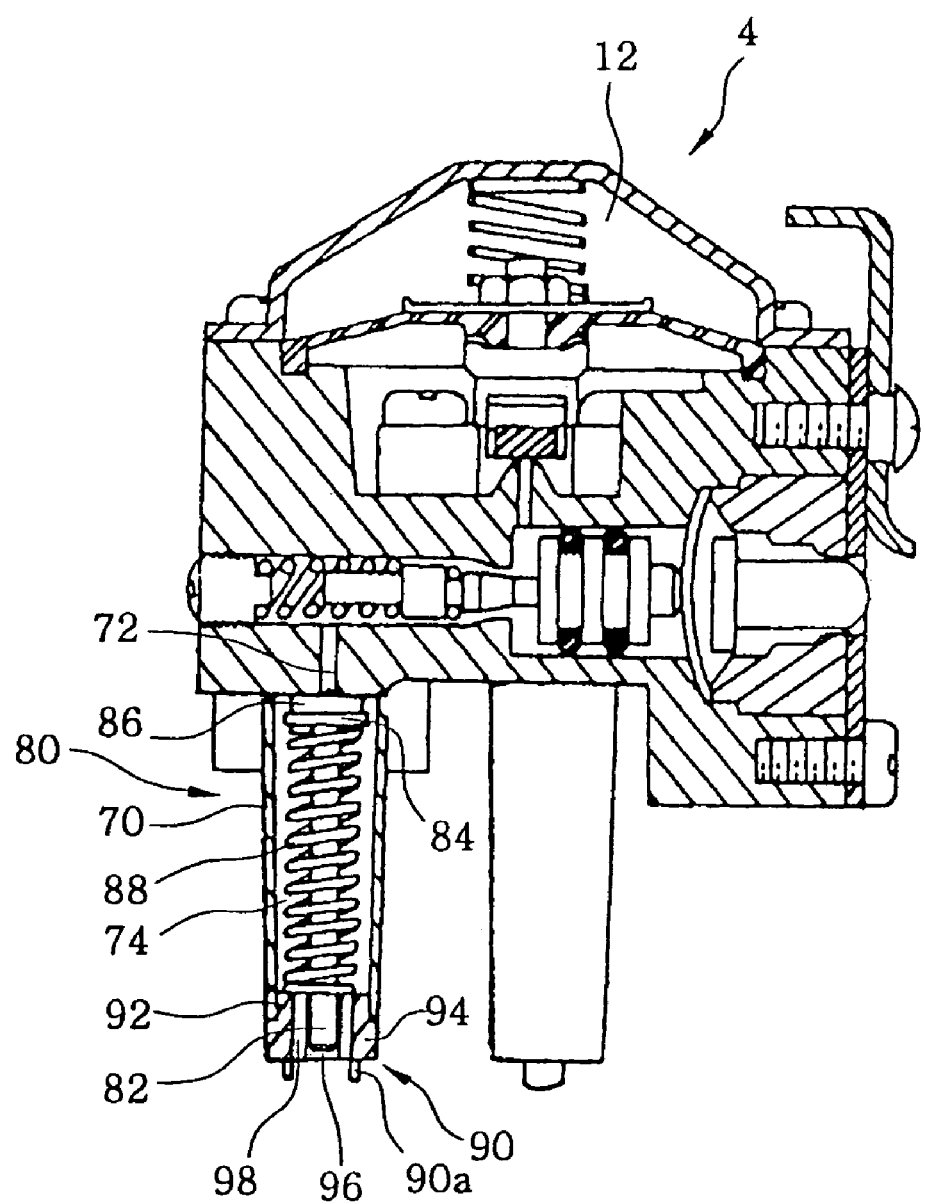
FIG. 8 is a front view of the hydrostat shown in FIG. 7.
Figure 9:
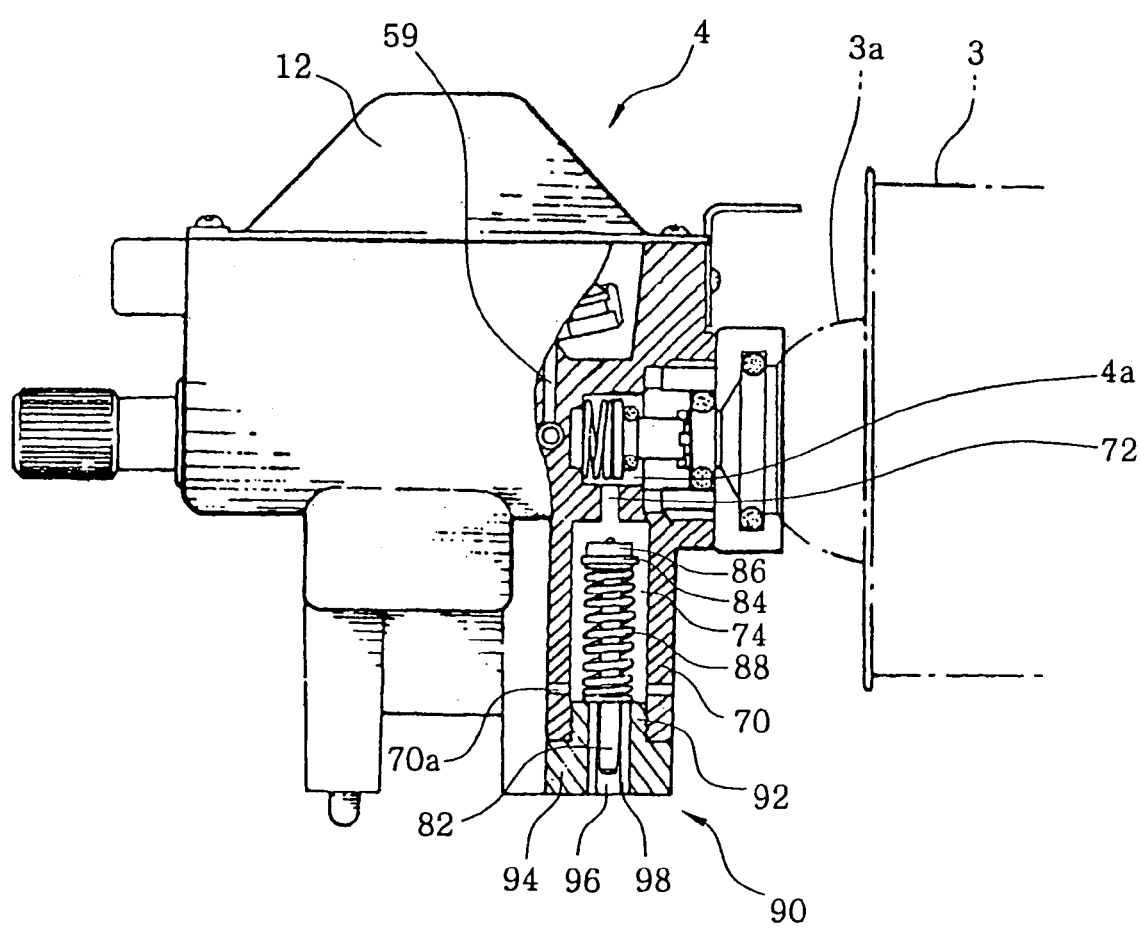
FIG. 9 is a side sectional view of the hydrostat shown in FIG. 7.

Referring to FIGS. 7 through 9, a hydrostat for a portable gas range according to a first embodiment of the present invention includes a body 70 which is installed below a governor valve 4 of the gas range. Preferably, the body 70 has a cylindrical shape and includes a gas outlet 72, which communicates with a gas inlet 4a, and a sealed room 74, which communicates with the gas outlet 72. Particularly, the body 70 of the hydrostat according to the first embodiment may be formed as one leg among a plurality of legs for supporting the entire gas range.

An opening/closing unit 80 is installed to be movable up and down within the sealed room 74 of the body 70 in order to selectively open or close the gas outlet 72, more specifically, in order to open the gas outlet 72 when the inner pressure of a gas container exceeds a threshold value of deformation or a threshold value of explosion. The opening/closing unit 80 includes a sealing shaft 82 which is installed to be movable up and down within the sealed room 74 of the body 70. A circular support plate 84 is provided at the top of the sealing shaft 82. A sealing member 86 for actually opening or closing the gas outlet 72 is attached or mounted on the support plate 84. An elastic member 88 for elastically supporting the sealing shaft 82 is provided surrounding the sealing shaft 82 such that the sealing shaft 82 can move up and down. Preferably, the elastic member 88 is manifested as a compressive spring whose top end contacts and is fixed on the bottom of the support plate 84. Particularly, it is preferable that the elasticity or tension of the compressive spring as the elastic member 88 is greater than a dangerous pressure (for example, 5–7 kg/cm$^2$ or 4–6 kg/cm$^2$), at which usual safety devices operate, and smaller than a container deformation pressure or container explosion pressure.

A cap 90 is removably installed at the bottom of the body 70 in order to open or close the sealed room 74 of the body 70 and support the bottom end of the elastic member 88 of the opening/closing unit 80. The cap 90 includes a coupling portion 92, which is removably, for example, screw-coupled with the bottom portion of the body 70 to support the bottom portion of the elastic member 88, and a handle 94, which is integrated with the coupling portion 92 so that a user can hold and turn the cap 90. A guide hole 96 is formed at the center of the cap 90 such that it pierces through the cap 90 in a shaft direction. The bottom portion of the sealing shaft 82 of the opening/closing unit 80 is inserted into the guide hole 96 so that the up and down movement of the sealing shaft 82 is guided. Preferably, discharge holes 98 are formed at the side of the guide hole 96 in a lengthwise direction in order to discharge gas from a gas container.

Selectively, one or more discharge holes 70a communicating with the sealed room 74 may be formed at the lower portion of the body 70 to discharge gas from a gas container. Preferably, a plurality of protruding legs 90a are formed on the outer surface of the cap 90 so that the outer surface of the cap 90 can be separated from the ground in order to allow gas to be easily discharged through the discharge holes 98.

Figure 10:
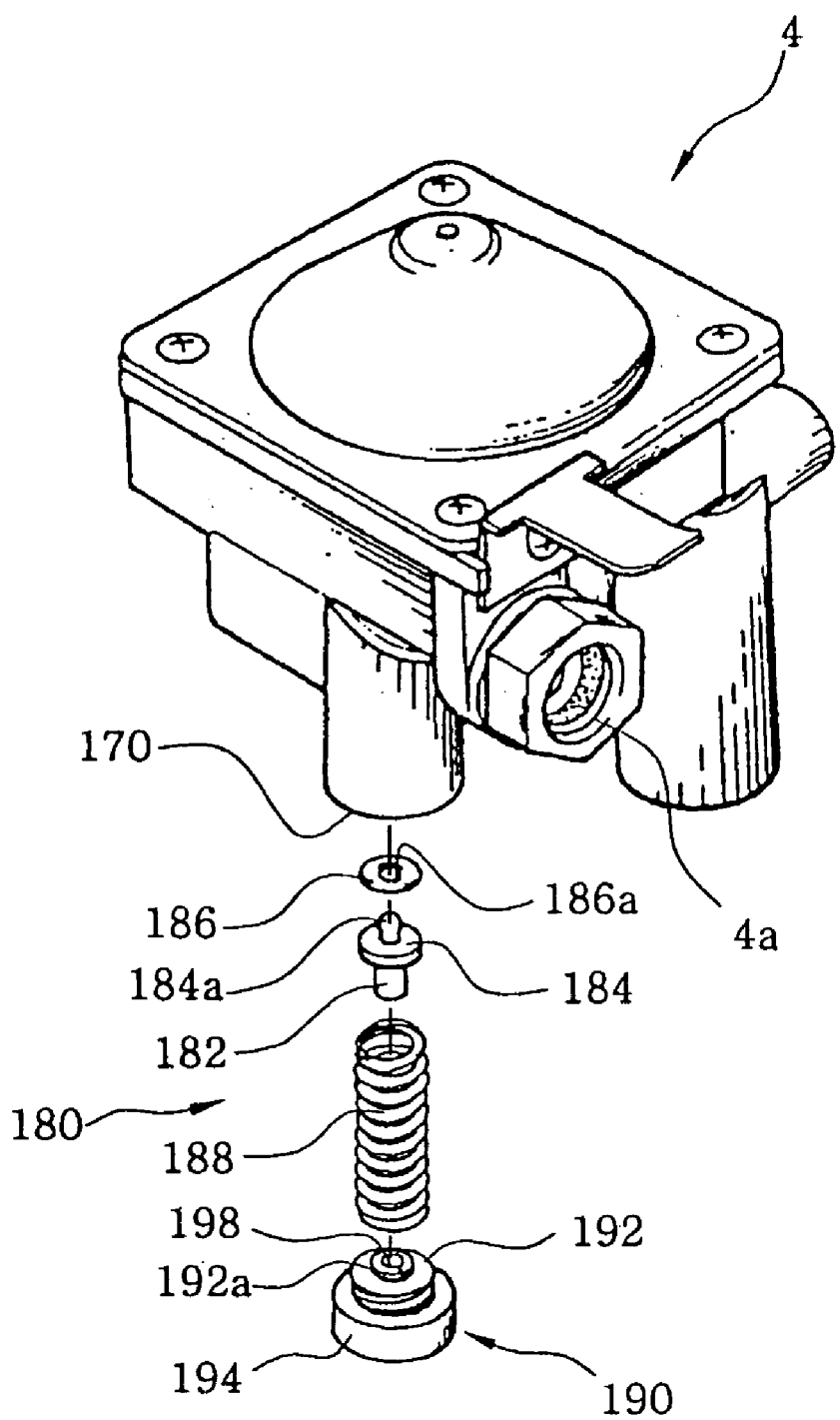
FIG. 10 is an exploded perspective view of a hydrostat for a portable gas range according to a second embodiment of the present invention.
Figure 11:
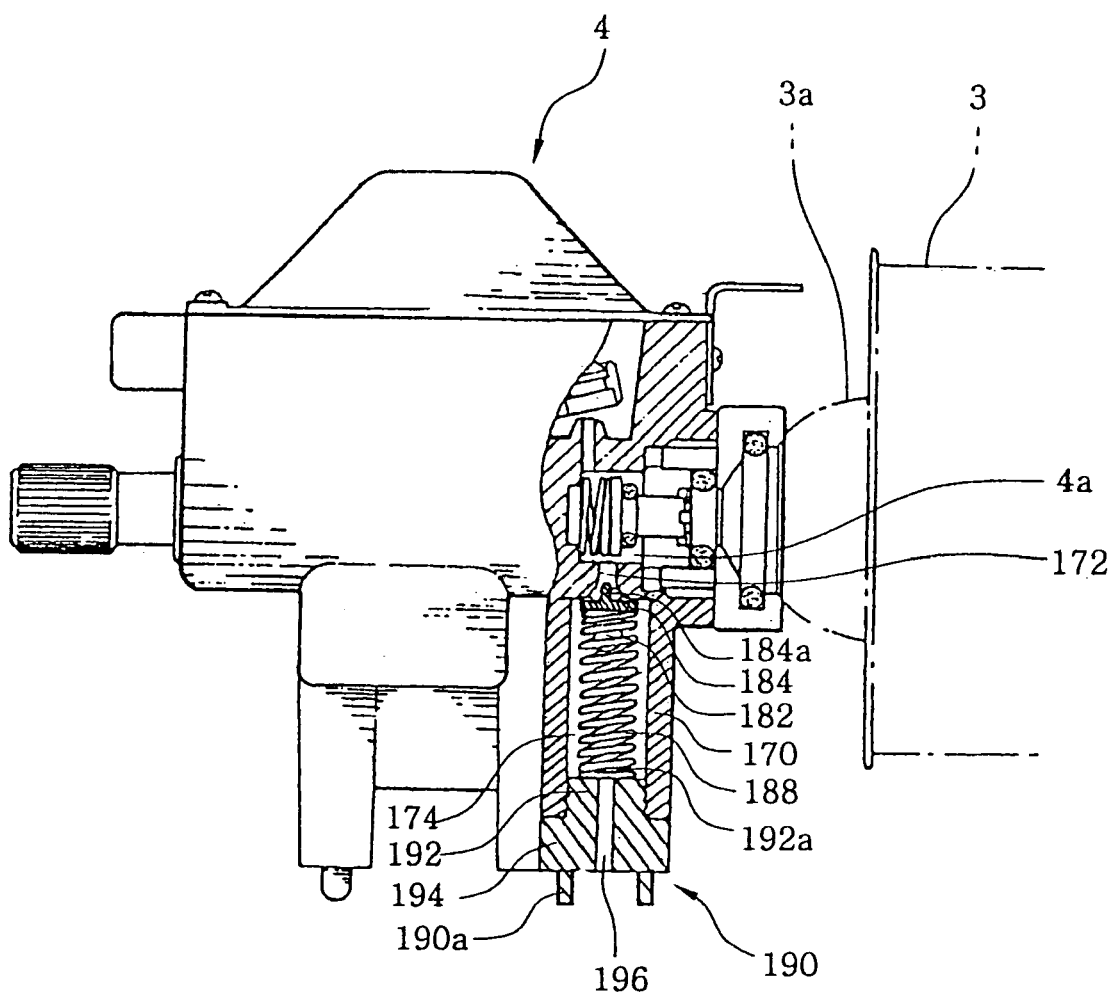
FIG. 11 is a partial sectional view of the hydrostat shown in FIG. 10.

Referring to FIGS. 10 and 11, a hydrostat according to a second embodiment of the present invention has a similar structure to the above first embodiment. Thus, reference numerals between 100 and 200 are used to distinguish the second embodiment from the first embodiment. The hydrostat for a portable gas range according to the second embodiment of the present invention includes a body 170 which is installed below the governor valve 4 of the gas range. Preferably, the body 170 has a cylindrical shape and includes a gas outlet 172, which communicates with the gas inlet 4a, and a sealed room 174, which communicates with the gas outlet 172. Particularly, a rounding process is performed on the discharging portion of the gas outlet 172, that is, a contact portion between the gas outlet 172 and the sealed room 174. The body 170 of the hydrostat according to the second embodiment may be formed as one leg among a plurality of legs for supporting the entire gas range. Selectively, one or more discharge holes (not shown) communicating with the sealed room 174 may be formed at the lower portion of the body 170 to discharge gas from a gas container.

An opening/closing unit 180 is installed to be movable up and down within the sealed room 174 of the body 170 in order to selectively open or close the gas outlet 172. The opening/closing unit 180 includes a sealing shaft 182 which is installed to be movable up and down within the sealed room 174 of the body 170. Particularly, the sealing shaft 182 is much shorter than the sealing shaft 82 of the first embodiment. A circular support plate 184 is provided at the top of the sealing shaft 182 and has a protruding keeper 184a. A sealing member 186 for actually opening or closing the contact portion of the gas outlet 172 is kept around and fixed at the keeper 184a of the support plate 184. Preferably, the sealing member 186 is made of an elastic material such as rubber and has a ring shape with a keeping hole 186a, through which the keeper 184 is inserted. The upper portion of an elastic member 188 for elastically supporting the sealing shaft 182 is provided surrounding the sealing shaft 182 such that the sealing shaft 182 can move up and down. Preferably, the upper portion of the elastic member 188 has the inside diameter which is similar to or the same as the outside diameter of the sealing shaft 182 and is manifested as a compressive spring whose top end contacts and is fixed on the bottom of the support plate 184. It is also preferable that the elasticity or tension of the compressive spring as the elastic member 188 is greater than a dangerous pressure (for example, 5–7 kg/cm$^2$ or 4–6 kg/cm$^2$), at which usual safety devices operate, and smaller than a container deformation pressure or container explosion pressure.

A cap 190 is removably installed at the bottom of the body 170 in order to open or close the sealed room 174 of the body 170 and support the bottom end of the elastic member 188 of the opening/closing unit 180. The cap 190 includes a coupling portion 192, which is removably, for example, screw-coupled with the bottom portion of the body 170, and a handle 194, which is integrated with the coupling portion 192 so that a user can hold and turn the cap 190. Particularly, a keeper 192a is integrally formed at the coupling portion 192 of the cap 190 such that the bottom portion of the elastic member 188 is fixed at or is installed surrounding the keeper 192a. A discharge hole 198 is formed at the center of the cap 190 in a lengthwise direction in order to discharge gas from a gas container. A plurality of protruding legs 190a may be formed on the outer surface of the cap 190 so that the outer surface of the cap 190 can be separated from the ground in order to prevent the discharge hole 198 from being blocked by the ground.

Figure 12:
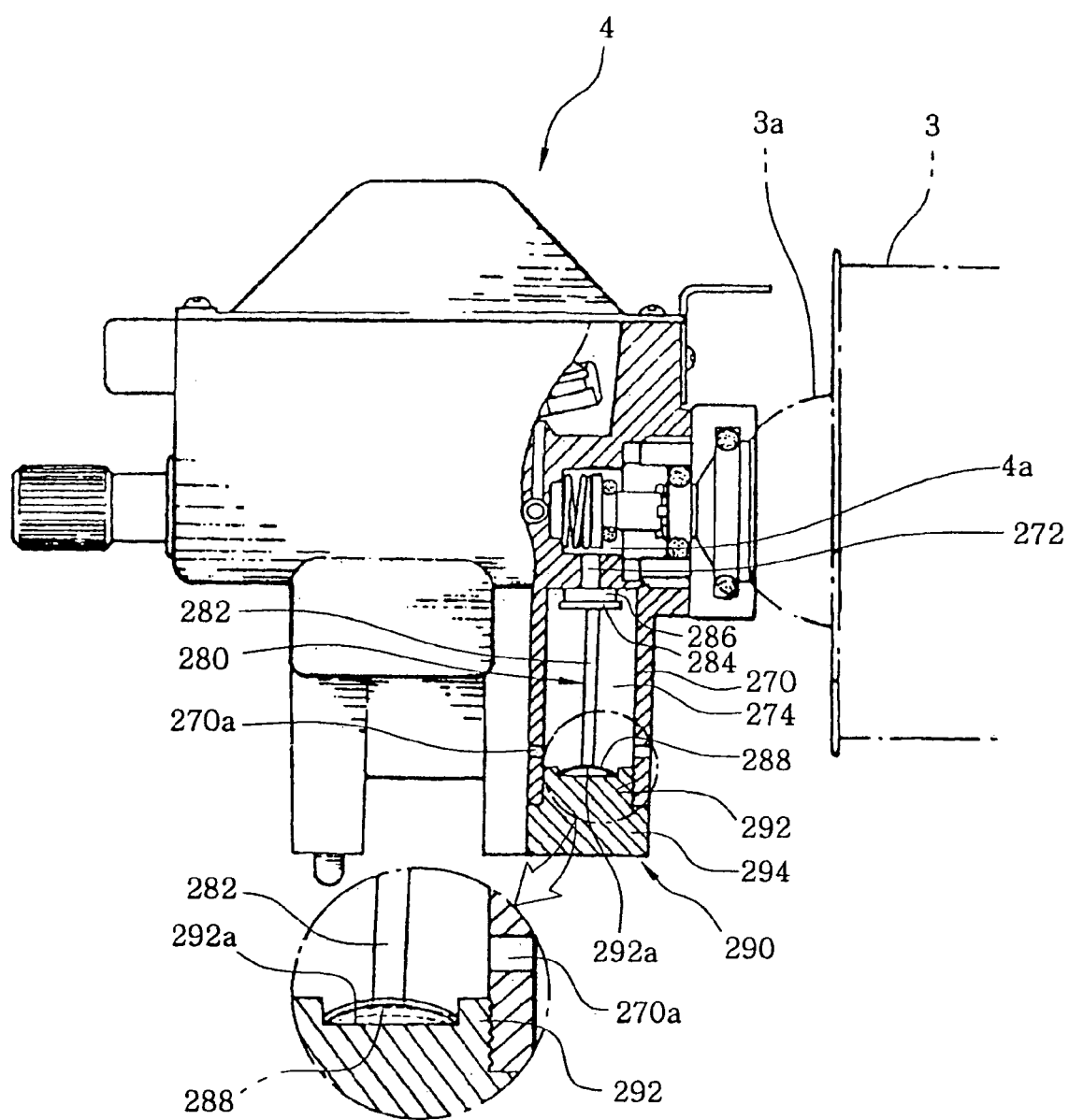
FIG. 12 is a partial sectional view of a hydrostat for a portable gas range according to a third embodiment of the present invention.

Referring to FIG. 12, a hydrostat for a portable gas range according to a third embodiment of the present invention has a similar structure to the above first and second embodiments. Thus, reference numerals between 200 and 300 are used to distinguish the third embodiment from the first and second embodiments. The hydrostat according to the third embodiment of the present invention includes a body 270 which is installed below the governor valve 4 of the gas range. Preferably, the body 270 has a cylindrical shape and includes a gas outlet 272, which communicates with the gas inlet 4a, and a sealed room 274, which communicates with the gas outlet 272. Particularly, the body 270 of the hydrostat according to the third embodiment may be formed as one leg among a plurality of legs for supporting the entire gas range. Selectively, a discharge hole 270a communicating with the sealed room 274 may be formed at the lower portion of the body 270 to discharge gas from a gas container.

An opening/closing unit 280 is installed within the sealed room 274 of the body 270 such that it can move up and down within the sealed room 274 in order to selectively open or close the gas outlet 272. The opening/closing unit 280 includes a sealing shaft 282 which is installed to be elastically movable up and down within the sealed room 274 of the body 270. A circular support plate 284 is provided at the top of the sealing shaft 282. A sealing member 286, which is made of an elastic material such as rubber for actually opening or closing the gas outlet 272, is attached or mounted on the support plate 284. An elastic member 288 for elastically supporting the sealing shaft 282 is provided at the bottom of the sealing shaft 282 such that the sealing shaft 282 can move up and down. Preferably, the elastic member 288 is manifested as a plate spring. As in the first and second embodiments, it is also preferable that the elasticity or tension of the plate spring as the elastic member 288 is greater than a dangerous pressure (for example, 5–7 kg/cm² or 4–6 kg/cm²), at which usual safety devices operate, and smaller than a container deformation pressure or container explosion pressure.

A cap 290 is removably installed at the bottom of the body 270 in order to open or close the sealed room 274 of the body 270 and support the elastic member 288 of the opening/closing unit 280. The cap 290 includes a coupling portion 292, which is removably, for example, screw-coupled with the bottom portion of the body 270 and has a keeping groove 292a for elastically receiving the elastic member 288 therein; and a handle 294, which is integrated with the coupling portion 292 so that a user can hold and turn the cap 290. Selectively, although not shown, a discharge hole may be formed in the cap 290 in order to discharge gas from a gas container. In addition, a plurality of protruding legs (not shown) may be formed on the outer surface of the cap 290 so that the outer surface of the cap 290 can be separated from the ground in order to allow gas to be easily discharged through the discharge hole.

Figure 13:
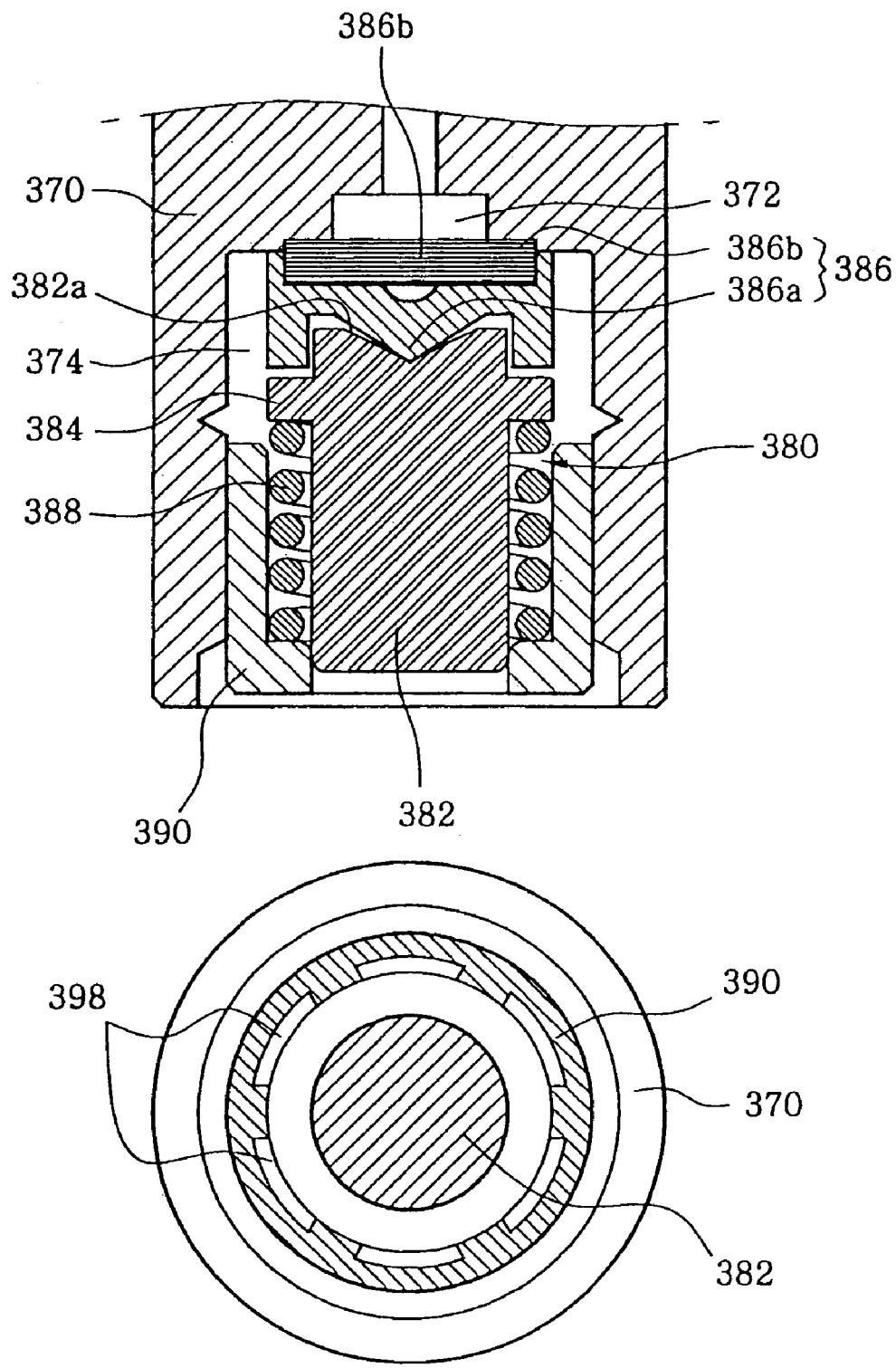
FIG. 13 is a partial sectional view of a hydrostat for a portable gas range according to a fourth embodiment of the present invention.

Referring to FIG. 13, a hydrostat for a portable gas range according to a fourth embodiment of the present invention also has a similar structure to the above first, second, and third embodiments. Thus, reference numerals between 300 and 400 are used to distinguish the fourth embodiment from the first through third embodiments. The hydrostat for a portable gas range according to the fourth embodiment of the present invention includes a body 370 which is installed below the governor valve 4 of the gas range. Preferably, the body 370 has a cylindrical shape and includes a gas outlet 372, which communicates with the gas inlet 4a, and a sealed room 374, which communicates with the gas outlet 372. Particularly, the body 370 of the hydrostat according to the fourth embodiment may be formed as one leg among a plurality of legs for supporting the entire gas range.

An opening/closing unit 380 is installed to be movable up and down within the sealed room 374 of the body 370 in order to selectively open or close the gas outlet 372, more specifically, in order to open the gas outlet 372 when the inner pressure of a gas container exceeds a threshold value of deformation or a threshold value of explosion. The opening/closing unit 380 includes a sealing shaft 382 which is installed to be movable up and down within the sealed room 374 of the body 370. A circular support plate 384 is provided at the upper portion of the sealing shaft 382. In addition, a support groove 382a is formed at the top portion of the sealing shaft 382. Preferably, the supporting groove 382a has a reversed-cone shape. A sealing member 386 for actually opening or closing the gas outlet 372 is supported by the support groove 382a. The sealing member 386 is composed of a reversed-cone-shaped support piece 386a, which is supported by the support groove 382a, and a seal piece 386b, which is made of an elastic material such as rubber and is fixed at the top of the support piece 386a in order to selectively open or close the gas outlet 372 of the body 370. An elastic member 388 for elastically supporting the sealing shaft 382 is installed surrounding the sealing shaft 382 such that the sealing shaft 382 can move up and down. Preferably, the elastic member 388 is manifested as a compressive spring whose top end contacts the bottom of the support plate 384. Particularly, as described in the above embodiments, it is preferable that the elasticity or tension of the compressive spring as the elastic member 388 is greater than a dangerous pressure (for example, 5–7 kg/cm² or 4–6 kg/cm²), at which usual safety devices operate, and smaller than a container deformation pressure or container explosion pressure.

Particularly, when the cap 390 is screw-coupled with the body 370 in the hydrostat according to the fourth embodiment, the sealing member 386 completely cover the gas outlet 372. More specifically, since the sealing member 386 is composed of the support piece 386a, which has a reversed-cone shape at the lower portion and a groove of a predetermined shape at the upper portion, and a seal piece 386b, which is received in the groove of the support piece 386a, the seal piece 386b can exactly contact the gas outlet 372 without distortion. Consequently, in such a structure, when the cap 390 is screw-coupled with the body 370, while the sealing shaft 382 simultaneously performs a rotating motion and a vertical rectilinear motion, the sealing member 386 performs only a vertical rectilinear motion, so the seal piece 386b can open or close the gas outlet 372 without distortion.

In the fourth embodiment of the present invention shown in FIG. 13, the reversed-cone-shaped support groove 382a is formed at the top portion of the sealing shaft 382, and the lower portion of the support piece 386a of the sealing member 386 has a reversed-cone shape. However, it will be easily understood by one of ordinary skill in the art of the present invention that a similar effect can be achieved by forming the sealing shaft 382 to have a cone-shaped upper portion and forming the support piece 386a to have a cone-shaped groove at its bottom.

In addition, the cap 390 is removably installed at the bottom of the body 370 not only to open or close the sealed room 374 of the body 370 but also to support the bottom end of the elastic member 388 of the opening/closing unit 380. For example, the cap 390 is removably screw-coupled with the bottom portion of the body 370. Particularly, a plurality of discharge holes 398 are formed in the inner wall of the cap 390 in a lengthwise direction such that it communicates with the sealed room 374 of the body 370 and discharges gas from a gas container.

Selectively, although not shown, a plurality of protruding legs may be formed on the outer bottom surface of the cap 390 so that the outer bottom surface of the cap 390 can be separated from the ground in order to allow gas to be easily discharged through the discharge holes 398.

In the above embodiments, each of the caps 90, 190, 290, and 390 is screw-coupled with the body 70, 170, 270, or 370, so the elasticity of the elastic member 88, 188, 288, or 388 can be adjusted by fastening or loosening the cap 90, 190, 290, or 390. However, it will be easily understood by one or ordinary skill in the art of the present invention that the cap may be fixed to the body, for example, by pressing the body around the cap after the elasticity of the elastic member is adjusted. The reason one or more discharge holes 98, 198, or 398 are formed in a lengthwise direction to face the ground is to allow butane gas, which has larger specific gravity than the air, to be swiftly discharged from a gas container.

In the above embodiments, the hydrostat for a portable gas range according to the present invention is installed below the governor valve of the portable gas range. However, it will be easily understood by one of ordinary skill in the art of the present invention that in other embodiments the hydrostat can be installed beside or above the governor valve on condition that the body of the hydrostat communicates with the gas inlet of the governor valve.

Hereinafter, the operations and effects of the hydrostats for a portable gas range according to the above-described embodiments will be described in detail.

The hydrostat according to the first embodiment shown in FIGS. 7 through 9 is installed below the governor valve 4 of a gas range or can be implemented as a leg of the gas range. In a normal state, that is, when the inner pressure of a gas container is maintained at a normal level, the gas outlet 72 of the body 70 is maintained closed due to sealing shaft 82 of the opening/closing unit 80. More specifically, the sealing shaft 82 moves upward due to the tension of the elastic member 88, so the sealing member 86 provided at the top of the support plate 84 of the sealing shaft 82 closes the gas outlet 72. Accordingly, gas from the gas container passes through a gas inlet and is supplied to a burner so that cooking can be performed normally.

In this state, for example, if a radiant heat is excessively applied to the gas container increasing the inner pressure of the gas container to a dangerous value or over, a flow-blocking safety device primarily operates to block the gas flow from the nozzle 59 to the chamber 12 and extinguish the fire. Thereafter, if the inner pressure of the gas container reaches threshold value of deformation or a threshold value of explosion due to a radiant heat that is continuously applied from a cooker, such as a frying pan, to the gas container, the inner pressure of the gas container becomes larger than the tension of the elastic member 88, which supports the sealing shaft 82 to close the gas outlet 72. Then, the elastic member 88 is compressed and simultaneously, the sealing shaft 82 is moved downward separating the sealing member 86 from the gas outlet 72. Here, the sealing shaft 82 is guided by the guide hole 96 of the cap 90 therebelow so that it can be reliably moved.

It has been described with reference to FIGS. 7 through 9 that the portable gas range employs a flow-block safety device. However, the similar description to the above one can be applied to a case where the portable gas range employs a container-detaching safety device. More specifically, when a radiant heat is excessively applied to the gas container, increasing the inner pressure of the gas container to a dangerous value or more, the gas container is primarily detached from the governor valve 4 by the container-detaching safety device, interrupting the supply of gas. Thereafter, if the inner pressure of the gas container reaches threshold value of deformation or over due to a radiant heat that is continuously applied from a cooker, such as a frying pan, to the gas container, the deformable portion 3*a* of the gas container expands and closely contacts the governor valve 4. In this state, if the inner pressure of the gas container continuously increases and becomes larger than the tension of the elastic member 88, which supports the sealing shaft 82 to close the gas outlet 72, the elastic member 88 is compressed and simultaneously, the sealing shaft 82 is moved downward separating the sealing member 86 from the gas outlet 72.

By opening the gas outlet 72, overcompressed gas passes through the gas outlet 72 and the sealed room 74 of the body 70 and is discharged through the discharge hole 98. In addition, a large volume of gas can be instantly discharged through the discharge holes 70*a* formed in the body 70. In the mean time, since the outer surface of the gap 90 is separated from the ground, the gas can be reliably and easily discharged through the discharge hole 98 formed in the cap 90. When the overcompressed gas is discharged from the gas container and the inner pressure of the gas container returns to a normal state, the sealing shaft 82 is moved upward by the tension or elasticity of the elastic member 88 so that the sealing member 86 blocks the gas outlet 72, thereby preventing gas from further escaping. As described above, overcompressed gas is discharged from the gas container by the opening/closing unit 80, which automatically operates when the inner pressure of the gas container excessively increases, thereby preventing the explosion of the gas container.

According to the hydrostat shown in FIGS. 10 and 11 for a portable gas range according to the second embodiment of the present invention, in a normal state as described in the first embodiment, when a radiant heat is excessively applied to a gas container, increasing the inner pressure of the gas container to a dangerous value or more, the gas container is primarily detached from the governor valve 4 by a container-detaching safety device, interrupting the supply of gas. Thereafter, if the inner pressure of the gas container reaches threshold value of deformation or over due to a radiant heat that is continuously applied from a cooker to the gas container, the deformable portion 3*a* of the gas container expands and closely contacts the governor valve 4. In this state, if the inner pressure of the gas container continuously increases and becomes larger than the tension of the elastic member 188, which supports the sealing shaft 182 to close the gas outlet 172, the elastic member 188 is compressed and simultaneously, the sealing shaft 182 is moved downward separating the sealing member 186 from the gas outlet 172.

By opening the gas outlet 172, overcompressed gas passes through the gas outlet 172 and the sealed room 174 of the body 170 and is discharged through the discharge hole 198. When the overcompressed gas is discharged from the gas container and the inner pressure of the gas container returns to a normal state, the sealing shaft 182 is moved upward by the tension or elasticity of the elastic member 188 so that the sealing member 186 blocks the gas outlet 172, thereby preventing gas from further escaping. As described above, overcompressed gas is discharged from the gas container by the opening/closing unit 180, which automatically operates when the inner pressure of the gas container excessively increases, thereby preventing the explosion of the gas container.

According to the hydrostat shown in FIG. 12 for a portable gas range according to the third embodiment of the present invention, in a normal state as described in the first and second embodiments, when a radiant heat is excessively applied to a gas container, increasing the inner pressure of the gas container to a dangerous value or more, the gas container is primarily detached from the governor valve 4 by a container-detaching safety device, interrupting the supply of gas. Thereafter, if the inner pressure of the gas container reaches threshold value of deformation or over due to a radiant heat that is continuously applied from a cooker to the gas container, the deformable portion 3*a* of the gas container expands and closely contacts the governor valve 4. In this state, if the inner pressure of the gas container continuously increases and becomes larger than the tension of the elastic member 288, which supports the sealing shaft 282 to close the gas outlet 272, the elastic member 288, i.e., a plate spring, is compressed and simultaneously, the sealing shaft 282 is moved downward separating the sealing member 286 from the gas outlet 272.

By opening the gas outlet 272, overcompressed gas passes through the gas outlet 272 and the sealed room 274 of the body 270 and is discharged through the discharge hole 270*a*, which communicates with the sealed room 274 in the body 270. When the overcompressed gas is discharged from the gas container and the inner pressure of the gas container returns to a normal state, the sealing shaft 282 is moved upward by the elasticity of the elastic member 288 so that the sealing member 286 blocks the gas outlet 272, thereby preventing gas from further escaping. As described above, overcompressed gas is discharged from the gas container by the opening/closing unit 280, which automatically operates when the inner pressure of the gas container excessively increases, thereby preventing the explosion of the gas container.

According to the hydrostat shown in FIG. 13 for a portable gas range according to the fourth embodiment of the present invention, in a normal state as described in the first through third embodiments, when a radiant heat is excessively applied to a gas container, increasing the inner pressure of the gas container to a dangerous value or more, the gas container is primarily detached from the governor valve 4 by a container-detaching safety device, interrupting the supply of gas. Thereafter, if the inner pressure of the gas container reaches threshold value of deformation or over due to a radiant heat that is continuously applied from a cooker to the gas container, the deformable portion 3a of the gas container expands and closely contacts the governor valve 4. In this state, if the inner pressure of the gas container continuously increases and becomes larger than the tension of the elastic member 388, which supports the sealing shaft 382 to close the gas outlet 372, the elastic member 388 is compressed and simultaneously, the sealing shaft 382 is moved downward separating the sealing member 386 from the gas outlet 372.

By opening the gas outlet 372, overcompressed gas passes through the gas outlet 372 and the sealed room 374 and is discharged through the discharge holes 398, which are formed along the circumference of the cap 390. When the overcompressed gas is discharged from the gas container and the inner pressure of the gas container returns to a normal state, the sealing shaft 382 is moved upward by the tension or elasticity of the elastic member 388 so that the sealing member 386 blocks the gas outlet 372, thereby preventing gas from further escaping. As described above, overcompressed gas is discharged from the gas container by the opening/closing unit 380, which automatically operates when the inner pressure of the gas container excessively increases, thereby preventing the explosion of the gas container. Accordingly, even if the inner pressure of the gas container continuously increases due to a radiant heat, which is applied from a cooker to the gas container during use of the gas range, overcompressed gas is automatically discharged, thereby automatically preventing the explosion of the gas container.

In the hydrostat according to the fourth embodiment, since the seal piece 386b of the sealing member 386 moves up and down either when the elasticity of the elastic member 388 is adjusted or when the sealing shaft 382 is installed, the sealing member 386 can exactly contact the gas outlet 372 having an even level without distortion or deformation so that the gas outlet 372 can be hermetically sealed by the opening/closing unit 380.

In the second through fourth embodiments of the present invention shown in FIGS. 10 through 13, it has been described that the portable gas range employs a container-detaching safety device. However, it will be easily understood by those of ordinary skill in the art of the present invention that the similar description to the first embodiment one can be applied to a case where the portable gas range employs a flow-blocking safety device in the second through fourth embodiments.

While this invention has been particularly shown and described with reference to preferred embodiments thereof, it will be understood by those skilled in the art that various changes may be made therein without departing from the scope of the invention. Therefore, the above-described embodiments will be considered not in restrictive sense but in descriptive sense only. The scope of the invention will be defined not by the above description but by the appended claims, and it will be construed that all differences made within the scope defined by the claims are included in the present invention.

Consequently, according to a hydrostat for a portable gas range according to the present invention, an opening/closing unit automatically operates to discharge gas when the inner pressure of a gas container excessively increases, thereby preventing the explosion of the gas container. Therefore, the safety and quality of products can be improved.

In addition, a hydrostat according to the present invention can be adapted to an existing portable gas range and has a simple structure, thereby increasing adaptability and productivity.

Moreover, since a hydrostat can be implemented as a leg of a portable gas range, convenience and simplicity can be improved.

What is claimed is:

1. A hydrostat for a portable gas range having a governor valve, and which includes at least one of either a container-detaching safety device for automatically detaching a gas container to interrupt gas flow and extinguish a fire when the inner pressure of the gas container reaches a dangerous value or a flow-blocking safety device for blocking the path of gas flow with the gas container still installed to extinguish a fire when the inner pressure of the gas container reaches a dangerous value, the hydrostat comprising:

a body comprising a gas outlet, which communicates with the governor valve, and a sealed room, which communicate with the gas outlet;

an opening/closing unit which is installed within the sealed room of the body for opening and closing the gas outlet;

an elastic member for biasing the opening/closing unit into a closed position when the inner pressure of the gas container does not exceed a threshold value and for allowing movement of the opening/closing unit to an open position to discharge gas from the gas container by opening the gas outlet when the inner pressure of the gas container reaches or exceeds the threshold value; and a cap which is fixed at the bottom of the body to support the elastic member and the opening/closing unit, wherein the opening/closing unit comprises a sealing shaft with a support plate at an upper portion thereof, the support plate having a reverse-cone-shaped support groove at the top portion thereof; a sealing member comprising a support piece, which has a reverse-cone-shaped bottom portion for engaging the support groove, and a seal piece for blocking the gas outlet when the opening/closing unit is in a closed position.

2. The hydrostat of claim 1, wherein the elastic member comprises a compressive spring whose top contacts and is fixed on the bottom surface of the support plate, and the elasticity of the elastic member allows movement of the opening/closing member to an open position when the inner pressure within the gas container reaches or exceeds the threshold value.

3. The hydrostat of claim 1, wherein the body further comprises a discharge outlet for discharging gas from the sealed room when the opening/closing unit is an open condition.

4. The hydrostat of claim 3, wherein the discharge outlet includes a plurality of discharge holes disposed at one end of the body.

5. A hydrostat for a portable gas range having a governor valve, and which includes at least one of either a container-detaching safety device for automatically detaching a gas container to interrupt gas flow and extinguish a fire when the inner pressure of the gas container reaches a dangerous value or a flow-blocking safety device for blocking the path of gas flow with the gas container still installed to extinguish a fire when the inner pressure of the gas container reaches a dangerous value, the hydrostat comprising:
- a body comprising a gas outlet, which communicates with the governor valve, and a sealed room, which communicate with the gas outlet;
- an opening/closing unit which is installed within the sealed room of the body for opening/closing and closing the gas outlet;
- an elastic member for biasing the opening/closing unit into a closed position when the inner pressure of the gas container does not exceed a threshold value and for allowing movement of the opening/closing unit to an open position to discharge gas from the gas container by opening the gas outlet when the inner pressure of the gas container reaches or exceeds the threshold value; and
- a cap which is fixed at the bottom of the body to support the elastic member and the opening/closing unit, wherein the opening/closing unit comprises a sealing shaft with a support plate at an upper portion thereof, the support plate having a cone-shaped top portion; a sealing member comprising a support piece having a cone-shaped support groove at the bottom portion thereof for engaging the top portion of the sealing shaft, and a seal piece for blocking the gas outlet when the opening/closing unit is in a closed position.

* * * * *